Nov. 21, 1933.  H. N. LEITER  1,936,306
HORSE SHOE
Filed Dec. 29, 1932  2 Sheets-Sheet 1
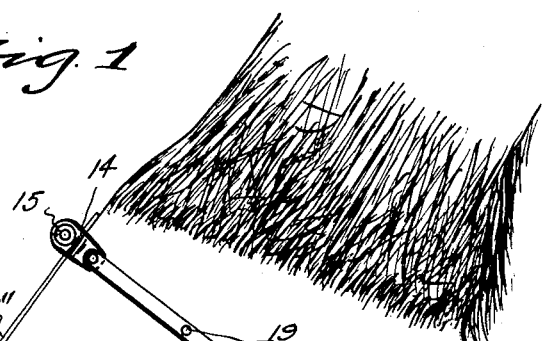
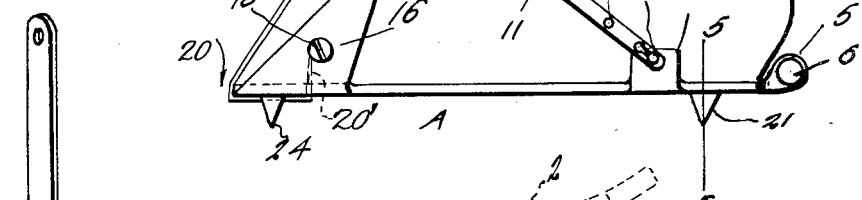
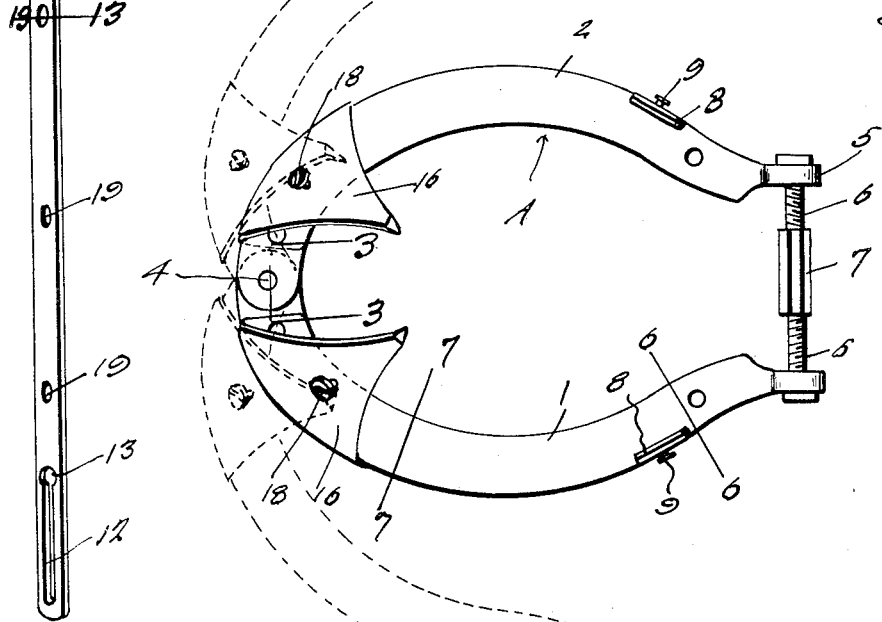
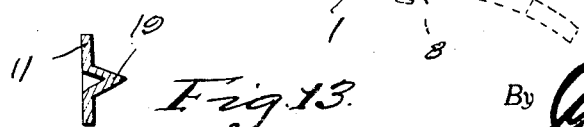
Inventor
Herman N. Leiter
By Clarence A. O'Brien
Attorney Nov. 21, 1933.   H. N. LEITER   1,936,306
HORSE SHOE
Filed Dec. 29, 1932   2 Sheets-Sheet 2
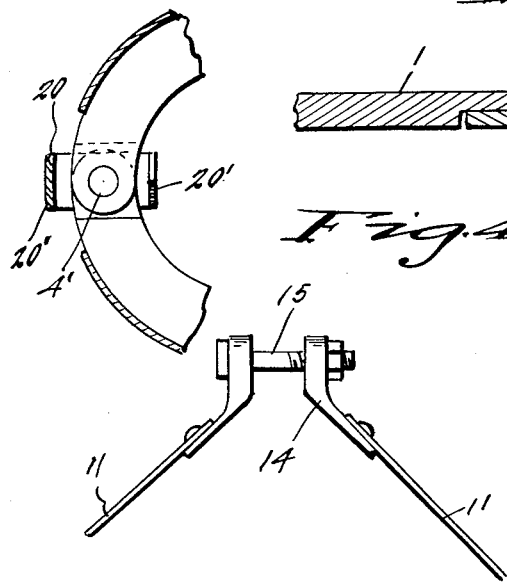
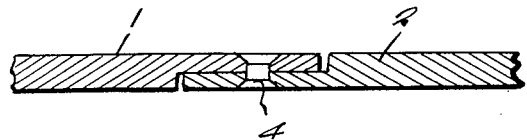
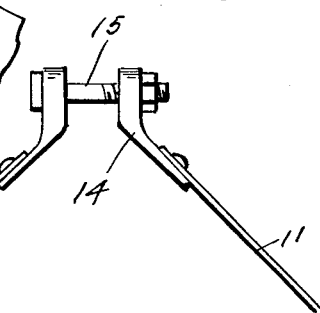
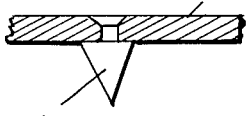
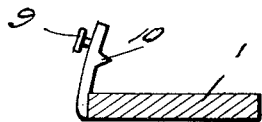
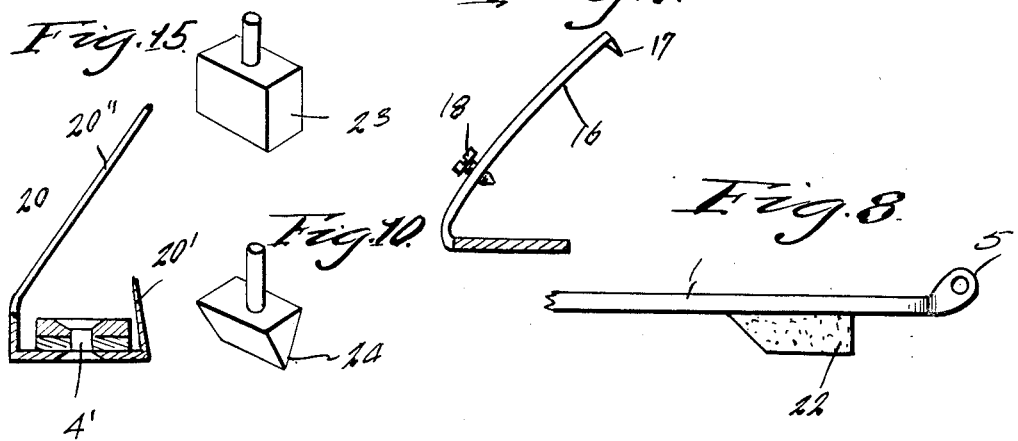
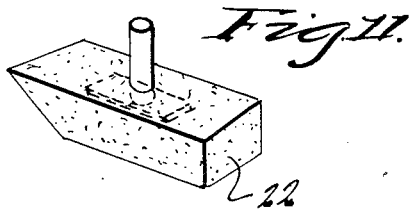
Inventor
Herman N. Leiter
By Clarence A. O'Brien
Attorney Patented Nov. 21, 1933

1,936,306

UNITED STATES PATENT OFFICE 1,936,306

HORSE SHOE

Herman N. Leiter, Walton, Ind.

Application December 29, 1932
Serial No. 649,391

1 Claim. (Cl. 168—22)

This invention relates to a horse shoe, the general object of the invention being to provide means whereby the shoe can be attached to the horse's hoof without nails and without taking the horse to a horse shoer with means for preventing the hoof from cracking.

Another object of the invention is to provide means whereby calks of various kinds can be readily attached to the shoe when desired, and to so form the shoe that it can be adjusted as desired.

This invention also consists in certain other features of construction and in the combination and arrangement of the several parts to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:—

Figure 1 is a view of a horse's foot showing the invention in use.

Fig. 2 is a top plan view of the shoe.

Fig. 3 is a section on line 3—3 of Fig. 2.

Fig. 4 is a top plan view of the front portion of the strap and the means for connecting them together.

Fig. 5 is a section on the line 5—5 of Fig. 1.

Fig. 6 is a section on the line 6—6 of Fig. 2.

Fig. 7 is a section on line 7—7 of Fig. 2.

Fig. 8 is a fragmentary side view showing a resilient calk attached to the shoe.

Figs. 9, 10 and 11 are views of various kinds of calks which may be used with the shoe.

Fig. 12 is a view of one of the straps.

Fig. 13 is a section on line 13—13 of Fig. 12.

Fig. 14 is a view showing a clip attached to the front end of the shoe.

Fig. 15 is a sectional view through this clip and a part of the shoe.

As shown in these drawings, the shoe A is formed of the two sections 1 and 2 which have their front ends reduced and overlapping and pivotally connected together by the rivet 4 so that the sections can be moved from the full line position shown in Fig. 2 to the dotted line position shown in said figure. The rear end of each section is turned vertically, and shaped to provide a perforated ear 5 for receiving the bolts 6 which are adjustably connected together by the elongated nut 7 so that by adjusting this nut 7, the width of the shoe can be adjusted.

Upstanding ears 8 are formed on the outer edges of the rear portions of the sections and outwardly extending studs 9 are formed on the ears and inwardly extending points 10 are also formed on the ears 8. These points will penetrate the hoof a slight distance to help hold the shoe in place. A strap 11 is removably connected to each stud 9 by having a slot 12 terminating in a hole 13 at its inner end for receiving the stud and angle brackets 14 are attached to the front ends of these straps and are connected together by a bolt 15 so that these straps when connected together by the bolt 15, as shown in Fig. 1 will also help hold the shoe in place.

Upwardly extending toe clips 16 are formed on the outer edges of the front portions of the sections and have inwardly extending points 17 at their upper ends for penetrating slightly the hoof, as when the clips are pressed against the hoof as shown in Fig. 1. Pointed screws 18 also pass thru threaded holes in the lower parts of the clips which penetrate the hoof a slight distance. Points 19 are formed on each strap 11 for slightly penetrating the hoof to prevent slipping of the straps.

Figs. 1, 14 and 15 show a clip 20 attached to the toe part of the shoe by the rivet 4' which hingedly connects the two sections together with an upwardly extending short point 20' at its inner end for engaging a part of the hoof and a longer point 20'' for extending upwardly over the front part of the hoof between the clips 16. This clip prevents the shoe from slipping ahead and can be used or not as desired. This part 20'' may extend under the brackets 14, as shown in Figure 1, though this is not absolutely necessary, as the point 20' engaging a part of the under portion of the hoof will hold the parts in position. The upper end of this part 20'' may be provided with a point to penetrate said front part of the hoof the same as the part 16 with its point 17 does, as shown in Figures 1 and 7.

Pointed calks such as shown at 21 in Figs. 1 and 5 may be used if desired with the shoe or a resilient calk 22 may be used when desired, these calks being shown in Figs. 8 and 11 or a calk such as shown at 23 in Fig. 9 or that shown at 24 in Fig. 10 can be used. These calks are provided with stems for entering holes formed in the shoe and can be upset, as shown in Fig. 5, to hold them in place and they can be easily knocked out when worn by a punch or the like so that similar or other types of calks can be substituted for the ones removed.

Thus it will be seen that I have provided a simple form of horse shoe which can be easily and quickly applied without use of nails and without taking the horse to a horse shoer, and that various kinds of calks can be used with the shoe. When attached, the shoe is firmly connected with the hoof and there is no danger of the horse knocking it off and the shoe will prevent cracking of the hoof. The shoe can be put in place and removed by ordinary tools and will last a long time.

It is thought from the foregoing description that the advantages and novel features of the invention will be readily apparent.

It is to be understood that changes may be made in the construction and in the combination and arrangement of the several parts provided that such changes fall within the scope of the appended claim.

Having thus described my invention, what I claim as new is:—

A horse shoe of the class described comprising a pair of sections having overlapping front ends, a rivet passing through said overlapping ends and hingedly connecting them together, eyes formed at the rear ends of the sections, bolts passing through the eyes, a turn buckle to which the inner ends of the bolts are threaded, upstanding clips connected with the shoe adjacent the front ends of the sections, for fitting over portions of the horse's hoof and having inwardly bent points engaging portions of the hoof, upstanding ears adjacent the rear of the shoe, straps detachably connected therewith and extending over the upper portion of the hoof, means for adjustably connecting together the front ends of the straps, inwardly extending points on said straps, and pointed screws carried by the clips, a member having a horizontal part passing under the overlapping ends of the sections and fastened to the shoe by said rivet, said member having its inner end bent upwardly to provide a short point and its front end bent upwardly and extending rearwardly to contact the front part of the hoof.

HERMAN N. LEITER.